US 12,358,050 B2

United States Patent
Lavernia et al.

(10) Patent No.: US 12,358,050 B2
(45) Date of Patent: Jul. 15, 2025

(54) ISOSTATIC PRESSURE SPARK PLASMA SINTERING (IP-SPS) NET SHAPING OF COMPONENTS USING NANOSTRUCTURED MATERIALS

(71) Applicants: The Regents of the University of California, Oakland, CA (US); National Technology & Engineering Solutions of Sandia, LLC, Albuquerque, NM (US)

(72) Inventors: Enrique J. Lavernia, Laguna Beach, CA (US); Baolong Zheng, Woodland, CA (US); Yizhang Zhou, Irvine, CA (US); Todd Monson, Albuquerque, NM (US)

(73) Assignee: The Regents of the University of California, Oakland, CA (US)

( * ) Notice: Subject to any disclaimer, the term of this patent is extended or adjusted under 35 U.S.C. 154(b) by 95 days.

(21) Appl. No.: 17/909,301

(22) PCT Filed: Mar. 3, 2021

(86) PCT No.: PCT/US2021/020742
§ 371 (c)(1),
(2) Date: Sep. 2, 2022

(87) PCT Pub. No.: WO2021/178588
PCT Pub. Date: Sep. 10, 2021

(65) Prior Publication Data
US 2023/0045680 A1    Feb. 9, 2023

Related U.S. Application Data

(60) Provisional application No. 62/985,223, filed on Mar. 4, 2020.

(51) Int. Cl.
B22F 3/15        (2006.01)
B22F 1/054      (2022.01)
(Continued)

(52) U.S. Cl.
CPC .............. B22F 3/15 (2013.01); B22F 1/054 (2022.01); B22F 1/065 (2022.01); B22F 3/105 (2013.01)

(58) Field of Classification Search
CPC .. B22F 3/15; B22F 1/054; B22F 1/065; B22F 3/105; B22F 3/156; B22F 2003/153;
(Continued)

(56) References Cited

U.S. PATENT DOCUMENTS

| | | | | |
|---|---|---|---|---|
| 5,348,694 A | * | 9/1994 | Goldberger | C04B 35/645 264/109 |
| 2005/0281702 A1 | * | 12/2005 | Clark | B22F 3/105 419/38 |
| 2022/0152700 A1 | * | 5/2022 | Hakeem | C22C 38/32 |

FOREIGN PATENT DOCUMENTS

| | | | | |
|---|---|---|---|---|
| JP | 2012237021 A | * | 12/2012 | B22F 3/105 |
| WO | WO-2011/030815 A1 | | 3/2011 | |
| WO | WO-2022185009 A1 | * | 9/2022 | B22F 1/052 |

OTHER PUBLICATIONS

International Search Report and Written Opinion for PCT/US2021/020742, dated May 25, 2021, 7 pages.

* cited by examiner

Primary Examiner — Rebecca Janssen
(74) Attorney, Agent, or Firm — Chong IP Law Group

(57) ABSTRACT

A method of forming a consolidated component having a complex shape includes providing a first component having a first shape similar to the complex shape. The method further includes placing the first component in a chamber and surrounding the first component with a medium. The
(Continued)

method further includes applying pressure and at least one of heat or electricity into the chamber to process the first component to form a consolidated component having the complex shape.

20 Claims, 8 Drawing Sheets

(51) Int. Cl.
  *B22F 1/065* (2022.01)
  *B22F 3/105* (2006.01)
(58) Field of Classification Search
  CPC .... B22F 2998/10; B22F 2999/00; B22F 3/02; B22F 3/10; B22F 3/225; B22F 2003/1051; B28B 3/025; B28B 3/086; B30B 11/001; B30B 15/34; B33Y 80/00
  See application file for complete search history.

ISOSTATIC PRESSURE SPARK PLASMA SINTERING (IP-SPS) NET SHAPING OF COMPONENTS USING NANOSTRUCTURED MATERIALS

CROSS-REFERENCE TO RELATED APPLICATIONS

This application is a National Stage Entry under 35 U.S.C. § 371 of International Application No. PCT/US2021/020742, filed Mar. 3, 2021, which claims the benefit and priority of U.S. Provisional Application No. 62/985,223, entitled "ISOSTATIC PRESSURE SPARK PLASMA SINTERING (IP-SPS) NET SHAPING OF COMPONENTS USING NANOSTRUCTURED MATERIALS," filed on Mar. 3, 2020, the entire disclosure of each of which are hereby incorporated by reference in their entirety.

GOVERNMENT SUPPORT STATEMENT

This invention was made with Government support under Contract No. DE-NA0003525 awarded by the United States Department of Energy/National Nuclear Security Administration. The Government has certain rights in the invention.

BACKGROUND

1. Field

The present disclosure is directed to systems and methods for isostatic pressure spark plasma sintering (IP-SPS) net shaping of components using at least one of nanostructured materials, ultrafine grained materials, or microstructured materials.

2. Description of the Related Art

Nanocrystalline (NC) materials (metals, ceramics, composites, or the like) with grain sizes which may be under $3.97 \times 10^{-6}$ inches (100 nanometers (nm)) have recently been a subject of research due to their desirable physical, mechanical and other properties, such as relatively high strengths. NC components (made, for example, with powder metallurgy from NC powder) are or may be utilized in multiple industries such as biomedical, aerospace, defense, and automotive). Conventional sinter processes, with relatively long consolidation cycles, have undesirable features, such as being time-consuming and typically causing significant grain growth, which is detrimental to the mechanical and physical properties of NC materials. In hot isostatic pressing (HIP) process, powders must be sealed into metal capsules or cans prior to a pressing cycle. Besides degassing, prior to HIP, the encapsulated powder must be maintained at high temperature under high pressure for several hours, which is an undesirably long processing time. Finally, HIP has challenges when applied to the consolidation of shaped ceramic components, since widely used metal cannisters cannot be used at the consolidation temperatures that are generally required by ceramic materials.

Thus, there is a need in the art for improved net shaping of components using at least one of nanostructured materials, ultrafine grained materials, or microstructured materials.

SUMMARY

Described herein is a method of forming a consolidated component having a complex shape. The method includes providing a first component having a first shape similar to the complex shape. The method further includes placing the first component in a chamber and surrounding the first component with a medium. The method further includes applying pressure and at least one of heat or electricity into the chamber to process the first component to form a consolidated component having the complex shape.

Also described is a method of forming a consolidated component. The method includes providing a first component having a first shape that corresponds to a desired shape of a finished component. The method further includes placing the first component in a chamber and surrounding the first component with a powder or particle medium. The method further includes applying uniaxial pressure and at least one of heat or electricity into the chamber to process the first component to form a consolidated component having the complex shape, such that the powder or particle medium converts the uniaxial pressure into at least one of isostatic pressure or quasi-isostatic pressure that is applied by the medium to the first component.

Also described is a system for forming a consolidated component. The system includes a powder or particle medium configured to function as a medium. The system further includes a chamber configured to receive a first component and the powder or particle medium such that the powder or particle medium surrounds the first preformed component. The system further includes a pressure source configured to apply pressure to the chamber. The system further includes at least one of a heat source or an electricity source configured to apply at least one of heat or electricity, respectively, to the chamber such that the pressure and the at least one of the heat or the electricity is applied simultaneously to the first component via the medium to consolidate the first component.

DETAILED DESCRIPTION

Figure 1A:
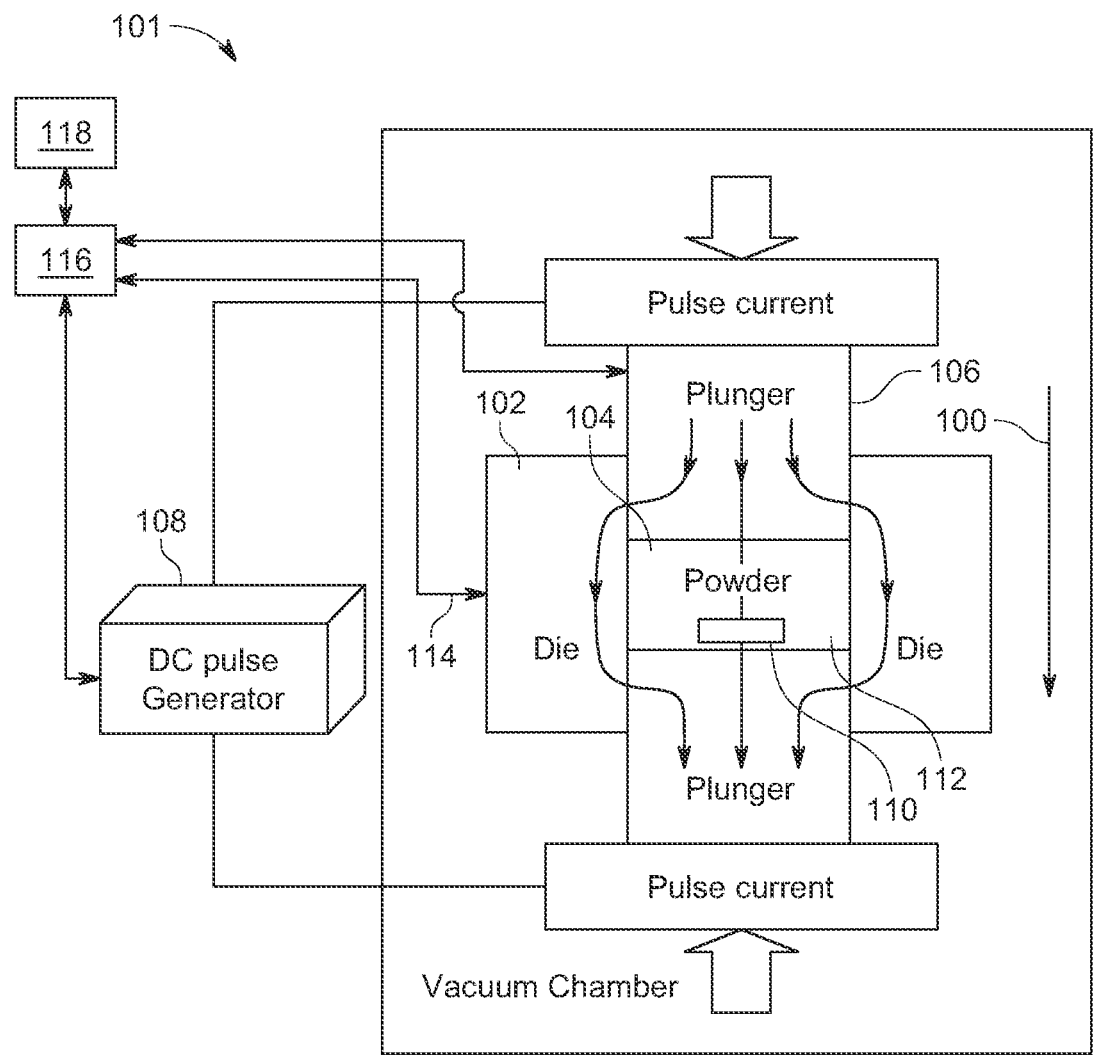
FIG. 1A is a drawing illustrating a system for isostatic pressure spark plasma sintering (IP-SPS) net shaping of components using nanostructured materials and utilizing a current source, in accordance with various embodiments of the present disclosure.

The present disclosure is directed to systems and methods for isostatic pressure spark plasma sintering (IP-SPS) net shaping of components using at least one of nanostructured materials, ultrafine grained materials, or microstructured materials. Where used in this context, nanostructured materials (grains having a dimension that is between 1 nanometer (1 nm) and 100 nm in size) may include nano-sized particles, nano-agglomerates, nanoclusters, or the like. Ultrafine grained materials (grains 100's of nm in size) may include agglomerates or micron sized particles that contain an ultrafine grained microstructure. Microstructured materials (grains of at least 1 micrometer (1 μm in size)) may include micro-sized particles, micro-agglomerates, microclusters, or the like. Although a specific portion of the disclosure may refer to one of nanostructured materials, ultrafine grained materials, or microstructured materials, one skilled in the art will realize that nanostructured materials, ultrafine grained materials, and microstructured materials may be used interchangeably throughout this specification, as well as mixed in pre-selected proportions to attain unique properties. The nanostructured, ultrafine, or microstructured materials may include metals, ceramics, composites, or the like.

The systems and methods described herein provide several benefits and advantages. In particular, the disclosure combines the advantages of isostatic pressing via hot isostatic pressing (HIP) with the fast sintering capability of spark plasma sintering (SPS) processing for net-shaping and sintering of nanocrystalline (NC) materials, ultrafine grained materials, microstructured materials, or the like. This may be especially beneficial for shaped NC ceramic components. In particular, the systems advantageously provide uniform shrinkage and consolidation of shaped components, resulting in a more homogenous microstructure and lower levels of residual stresses. The systems further advantageously result in components having enhanced physical and mechanical performance relative to both spark plasma sintering and hot isostatic pressing. In addition, the systems advantageously allow multiple components to be formed simultaneously in a single chamber (e.g., a die chamber), increasing manufacturing efficiency. The systems advantageously provide reduced processing time relative to spark plasma sintering and hot isostatic pressing, allowing for increased processing speed.

NC materials (metals, ceramics, composites, or the like) with grain sizes typically in under $3.97 \times 10^{-6}$ inches (100 nanometers (nm)) have been the topic of much interest recently, primarily due to their extraordinarily high strengths and enhanced physical properties. NC components (made, for example, with powder metallurgy from NC powder) have wide applicability in multiple industries (e.g., the biomedical, space, aerospace, and automotive industries). Conventional sinter processes, with a long consolidation cycle, are time-consuming and typically cause significant grain growth, which is particularly detrimental to the mechanical and physical properties of NC materials. In a hot isostatic pressing (HIP) process, powders must be sealed into metal capsules or cans prior to a pressing cycle. Besides degassing, the encapsulated powder must be maintained at high temperature under high pressure for several hours, which is a relatively long processing time. Finally, HIP has challenges when applied to the consolidation of shaped ceramic components, since widely used metal cannisters cannot be used at the consolidation temperatures that are generally required by ceramic materials, and the cannisters must be evacuated (vacuum) before HIP.

Spark plasma sintering (SPS) is a fast (i.e., relatively high-speed) powder consolidation/sintering technology that is capable of processing conductive and nonconductive materials. In principle, SPS is a pressure sintering method based on: (1) high-temperature plasma (spark plasma) momentarily generated in gaps between powder materials by electrical discharge at the beginning of ON-OFF direct current (DC) pulse energizing, and (2) applied axial pressure. The relatively large current pulse energizing method generates: (1) spark plasma, (2) spark impact pressure, (3) Joule heating, and (4) an electrical field diffusion effect. This sintering mechanism and the resulting mechanical properties of SPS sintered compacts show different characteristics relative to conventional pressure assisted sintering processes. The process offers significant advantages with various kinds of new materials and consistently produces a compact, relatively dense component in a shorter sintering time and of finer grain size than conventional sintering methods. In the SPS process, the powder particle surfaces are more easily purified and activated than in conventional electrical sintering processes, and material transfer at both the micro and macro levels are promoted, so a high-quality sintered compact is obtained at a lower temperature and in a shorter time than with conventional processes. However, there are several limitations with SPS processes. These limitations include: (1) Application of anaxial pressure during sintering may promote formation of deformation-induced texture in materials formed using SPS; and (2) SPS may only be suitable to sinter components with simple geometries (i.e., discs or cylinders) due to its uniqueness in axial pressure applied (i.e., pressure in SPS systems is only applied uniaxially).

The present disclosure presents a combination of the isostatic pressing of HIP and the fast sintering of SPS processing for fabrication of advanced materials, especially with controlled texture and complex shapes or geometries (e.g., net-shape/near net-shaped resulting components (i.e., the systems and methods described herein may produce components having complex shapes that include edges, corners, points, curves, or the like); where used throughout the specification, shape, geometry, and morphology refer to the same characteristics of a component, i.e., the internal and external shapes, patterns, features, and relative arrangement thereof of an object and including contours, edges, points, etc.).

FIG. 1A illustrates a system 101 for isostatic pressure spark plasma sintering (IP-SPS) net shaping of components using nanostructured materials. The system 101 may utilize a combination of hot isostatic pressing (HIP) and spark plasma sintering (SPS) to produce a component having a complex shape. That is, the system 101 may apply both isostatic pressure and at least one of current or thermal energy (i.e., heat) to a preformed component to consolidate and finalize formation of the component.

In particular, the system 101 may include a die 102. The die 102 may be similar to a SPS die. The die 102 may receive a preformed, or first, component 110 along with a powder or particle medium 112 having fluid properties (e.g., "powder" or "medium"). The powder 112 may surround the first component 110 within the die 102. That is, the powder may contact all or nearly all exposed surfaces of the first component. The system 101 may further include a chamber 104 (e.g., a die chamber 104 which may be formed with the die 102 and one or more plungers 106). The chamber may be designed to receive the die 102 having the preformed component 110 and the surrounding powder 112.

The system 101 may further include a pressure source 106 (e.g., plungers of the die chamber 104) that is designed to apply pressure to the chamber 104. For example, the pressure source 106 may include two plungers that apply uniaxial pressure to the die chamber 104. The pressure source 106 may be designed to apply uniaxial pressure to the chamber 104, such as in a direction shown by an arrow 100. The powder 112 may have properties that convert the uniaxial pressure applied by the pressure source 106 into isostatic pressure applied to the preformed component 110.

The system 101 may also include a current source 108. The current source 108 may be coupled to the chamber 104 and be designed to apply an electrical current to the chamber 104. For example, the current source 108 may include a direct current (DC) or alternating current (AC) power source. The current source 108 may apply a periodic or continuous current or a periodic or continuous voltage to the chamber 104. For example, the current source 108 may apply pulses of electrical current to the chamber 104.

The system 101 may further include one or more sensor 114. The sensor 114 may detect data corresponding to the chamber 104 such as a temperature of the chamber 104, an amount of pressure applied to the chamber 104, an amount of current flowing through the chamber 104, or the like.

The system 101 may further include a controller 116. The controller 116 may include a logic device such as one or more of a central processing unit (CPU), an accelerated processing unit (APU), a digital signal processor (DSP), a field programmable gate array (FPGA), an application specific integrated circuit (ASIC), or any other device capable of implementing logic. In various embodiments, the controller 116 may further include any non-transitory memory known in the art. The memory may store instructions usable by the logic device to perform operations as described herein. The controller 116 may control various parameters of the system 101 such as an amount of current generated by the current source 108, an amount of pressure applied by the pressure source 106, a duration of pressure and/or current application, a pulse width or duty cycle of the electricity, or the like.

The system 101 may further include a user interface 118. The user interface 118 may include an input device (e.g., a keyboard or mouse), an output device (e.g., a display or speaker), or a combined input and output device (e.g., a touchscreen). The user interface 118 may receive user input corresponding to operation of the system 101. For example, the user interface 118 may receive desirable parameters regarding operation of the system 101 such as a duration of pressure and current application to the chamber 104, information corresponding to material properties of the preformed component 110 or powder 112, or the like. In various embodiments, the user interface 118 may be directly or indirectly coupled to the current source 108 and the pressure source 106, and operation of the current source 108 and the pressure source 106 may be based directly or indirectly from the user input. Similarly, the user interface 118 may be directly or indirectly coupled to the sensor 114 and may output information detected by the sensor 114.

The controller 116 may control operation of the current source 108 and the pressure source 106 based on user input received via the user interface 118 and based on information detected by the sensor 114. For example, the controller 116 may control the current source 108 to output a square wave having a maximum current, a pulse width, and a duty cycle which have all been received from the user interface 118. As another example, the controller 116 may calculate or determine the maximum current, the pulse width, and the duty cycle based on the properties of the component 110 and the powder 112, the properties being received by the user interface 118.

The controller 116 may further control the user interface 118 to output information corresponding to usage of the system 101 such as a maximum current applied to the chamber 104, a maximum pressure applied to the chamber 104, a remaining processing time, or the like.

In particular, the controller 116 may control the pressure source 106 and the current source 108 to apply pressure and electricity to the chamber 104. The pressure may be applied isostatically to the component 110 due to the powder 112 while current flows through the component 110, thus applying both isostatic pressure and thermal energy to the component 110. This combination of isostatic pressure and thermal energy may compress the component 110 into a final desired shape, and may provide improved material properties relative to components processed using HIP or SPS.

Figure 1B:
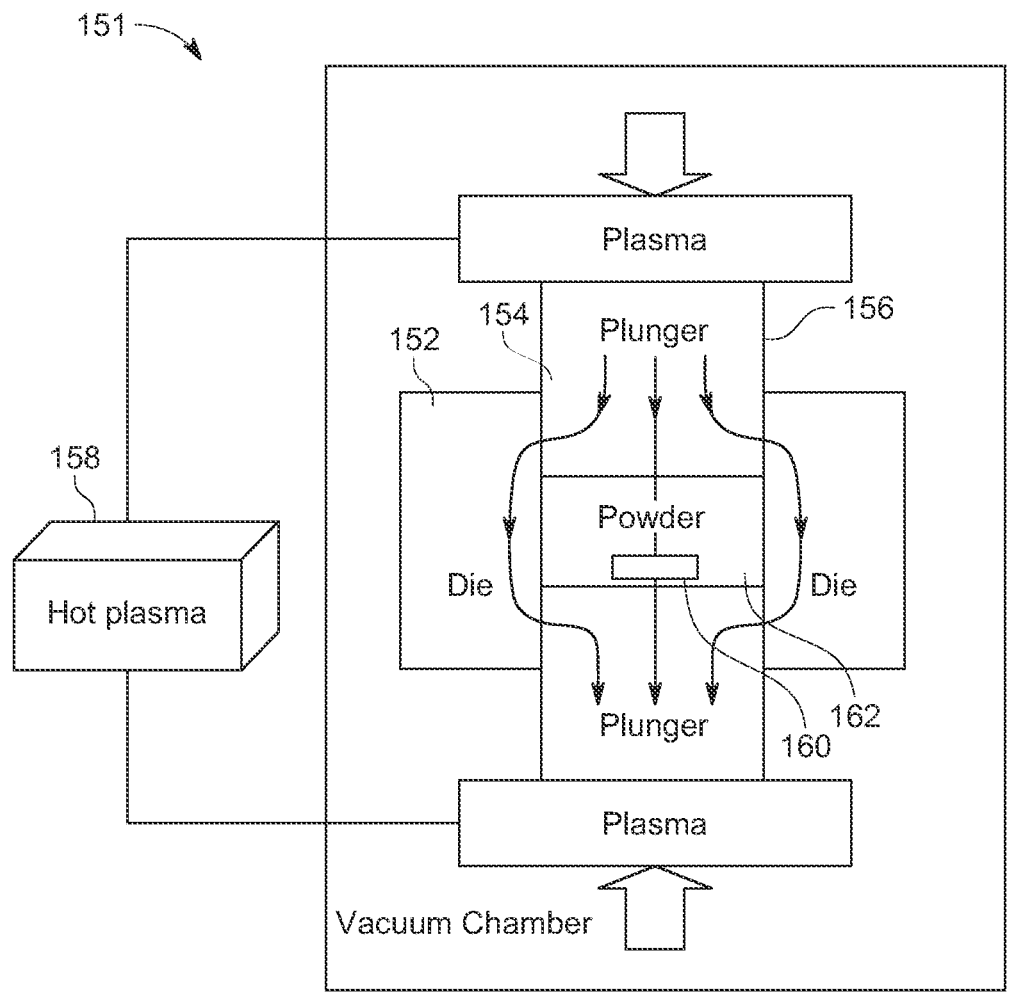
FIG. 1B is a drawing illustrating a system for IP-SPS net shaping of components using nanostructured materials and utilizing a heat source, in accordance with various embodiments of the present disclosure.

Referring to FIG. 1B, another system 151 for isostatic pressure spark plasma sintering (IP-SPS) net shaping of components using nanostructured materials is shown. The system 151 may include similar features as the system 101 of FIG. 1A. In particular, the system 151 may include a die 152, a chamber 154, and a pressure source 156. These components may function in a similar manner as the corresponding components of the system 101 of FIG. 1A. In particular, the die 152 may receive a preformed component 160 and a powder 162 which may apply isostatic pressure to the preformed component 160 in response to application of uniaxial pressure to the powder 162.

Instead of the current source 108 of FIG. 1A, the system 151 may include a thermal energy source 158. For example, the thermal energy source 158 may include a heating element which may directly apply thermal energy to the chamber 154 or may direct a hot gas into or through the chamber 154. The thermal energy source 158 may apply thermal energy to the chamber 154 to increase a temperature within the chamber 154 (e.g., to a temperature of between 300 degrees Celsius (300 degrees C.) and 4,000 degrees C. (572 degrees Fahrenheit (572 degrees F.) and 7,232 degrees F.), between 500 degrees C. and 4,000 degrees C. (932 degrees F. and 7,232 degrees F.), between 1,000 degrees C. and 3,000 degrees C. (1,832 degrees F. and 5,432 degrees F.), or the like). The relatively hot plasma may apply thermal energy to the preformed component 160, thus heating the preformed component 160 while the pressure source 156 applies pressure to the component 160.

Figure 2:
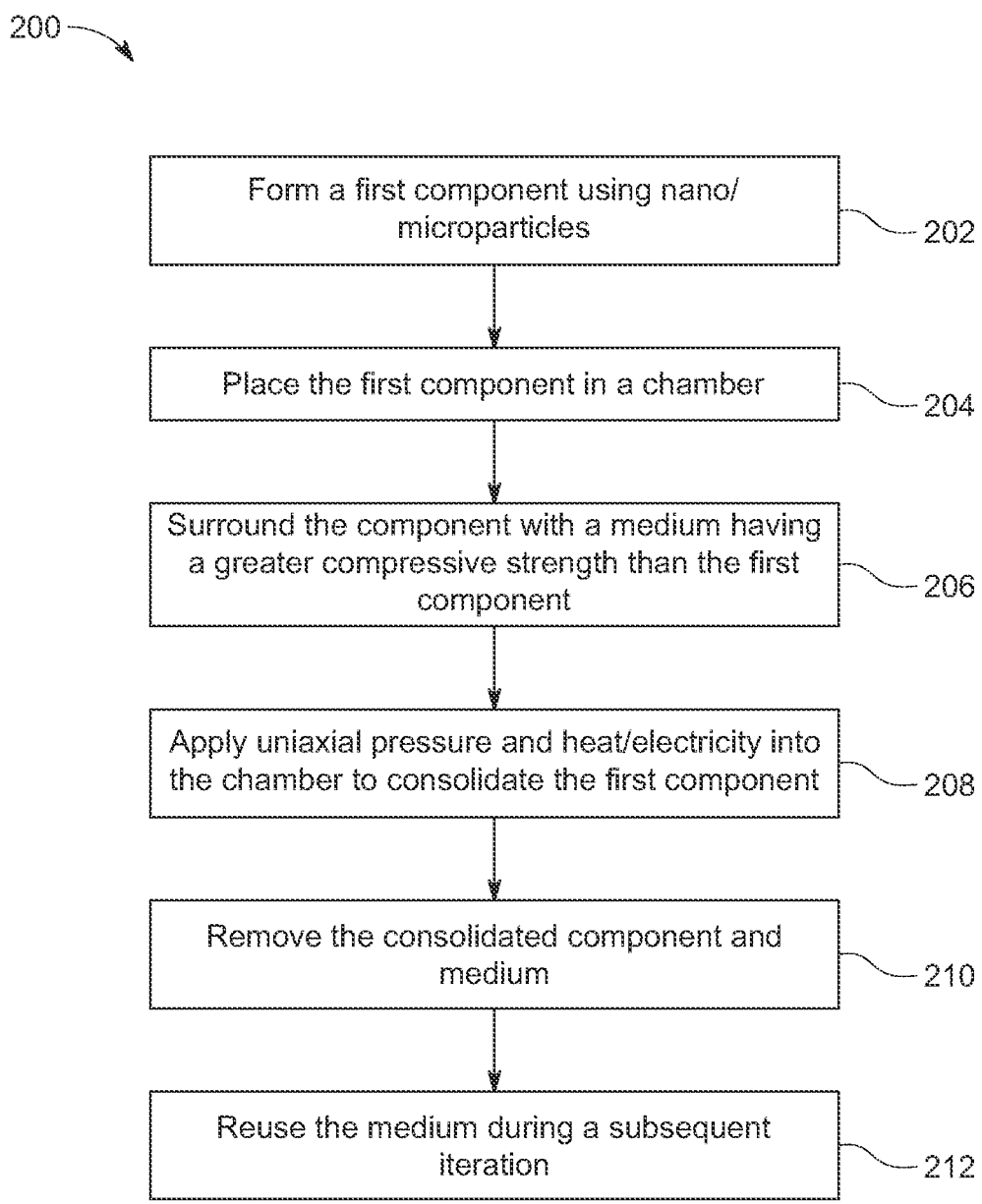
FIG. 2 is a flowchart illustrating a method for IP-SPS net shaping of components using nanostructured materials, in accordance with various embodiments of the present disclosure.

Referring now to FIG. 2, a method 200 for isostatic pressure spark plasma sintering (IP-SPS) net shaping of components using nanostructured materials is shown. The method 200 may utilize a combination of HIP and SPS to produce a component having a complex shape. For example, the method 200 may be performed using a system similar to the system 101 of FIG. 1A or the 151 of FIG. 1B.

The method 200 begins in block 202 where a first component may be formed or provided. Where used herein, "first component" refers to an unfinished product that will be consolidated to a final form using the method 200. The first component may have a complex shape such as a prism, a cube, edges, corners, curves, or any other complex shape such as a lens, a tooth, a representation of another body part, or the like. The first component may be formed using any technique such as injection molding, 3D printing (i.e., additive manufacturing), mold powder casting, net-shape sintering, milling, or any other method of forming a simple or complex shape. For example, the first component may be formed via computer-aided-design (CAD) processes or via any other conventional or non-conventional formation method. In various embodiments, the first component may be formed using nanoparticles or microparticles and may include any materials. For example, the first component may be formed or provided having nano-sized or micro-sized particles (or nanocrystalline or microcrystalline structures) of a metal, a ceramic, a composite, or any other material or combination of materials. The material of the first component may have grain sizes under 100 micrometers, 10 micrometers, 1 micrometer, 100 nanometers, 10 nanometers, or the like, or may include particles having multiple grain sizes.

Application of the method 200 to the first component results in compression of the first component into the final component. The anticipated material shrinkage from the method 200 is taken into consideration when pre-forming the pre-formed components so that the desired shape and dimensions of the final product are achieved. That is, the method 200 may include a step prior to block 202 which includes calculating the anticipated material shrinkage during the method 200 and forming the first component to have dimensions that are sufficiently larger than the desired final component dimensions to account for the anticipated shrinkage or compression. The anticipated shrinkage may be calculated based on the material properties of the material used for the first component, the amount of pressure, heat, and electricity that are to be applied, and the material properties of the material used as the fluid medium. In various embodiments, a controller may calculate optimal parameters of the processing based on material properties of the first component and the final component and desirable consolidation during processing. For example, a user may provide information indicating that 30 percent consolidation is desired, and the controller may calculate an optimal processing time, an optimal amount of pressure application, an optimal maximum current, an optimal pulse width, an optimal maximum current, and an optimal duty cycle.

In block 204, the first component may be placed in a chamber. For example, the chamber may include a SPS chamber of a SPS system, like the system 101 of FIG. 1A. In various embodiments, the first component may be placed in a SPS die similar to the die 102 of FIG. 1A.

In block 206, the first component may be surrounded with a medium, such as a powder. The powder may include a fine spherical powder which may have a relatively high ability to flow. In various embodiments, non-spherical powder may be used as the medium, such as ceramics or graphite particles. In various embodiments, the ceramics or graphite particles may include spherical powder, non-spherical powder, or a combination of spherical and non-spherical powder. The term spherical may include perfect sphere shapes or spherical shapes with abnormalities that are less than 30 percent of the surface area, 20 percent of the surface area, 10 percent of the surface area, or the like. In that regard, the powder may operate as a fluid medium to transfer at least one of current, heat, or pressure to the first component. The medium may be installed in the chamber at least one of simultaneously with the first component, before the first component, or after the first component. For example, the chamber may be partially filled with a medium, the first component may be placed in the chamber, and then the remainder of the chamber may be filled with the medium. In that regard, the first component may be completely surrounded by the medium such that the medium contacts all or nearly all exposed surfaces of the first component. In various embodiments, multiple first components may be placed in the chamber with the medium such that the multiple first components may be processed simultaneously within the chamber.

As described above, the chamber may include a SPS die similar to the die 102 of FIG. 1A. In that regard and after receiving the first component and the medium, the SPS die may be placed into a SPS chamber similar to the chamber 104 of FIG. 1A. However, in various embodiments, the first component and the medium may be placed in a chamber that is different from a SPS chamber. In various embodiments, the method 200 may be applied to a chamber that lacks a die. The system may include means for applying pressure to the materials within the chamber as well as applying at least one of heat or electricity to the materials within the chamber.

In block 208, uniaxial pressure and at least one of heat or electricity may be applied to the medium in the chamber to consolidate the first component. For example, the applied pressure to the chamber may be between 1 kilonewton (1 kN) and 500 kN, between 2 kN and 200 kN, between 5 kN and 100 kN, or the like. The applied currents may be, for example, between 500 amps (500 A) and 10,000 A, between 1,000 A and 8,000 A, between 2,000 A and 5,000 A, or the like. The pressure and heat or electricity may be applied, for example, for a processing time of between 1 minute and 120 minutes, between 4 minutes and 60 minutes, between 10 minutes and 30 minutes, or the like with relatively high heating rates (e.g., up to 1000 Kelvin per minute).

In various embodiments, the pressure and heat or electricity may be applied to the chamber (and thus the pre-formed component) simultaneously. For example and referring to FIG. 1A, the die 102 may be filled with the first component and the medium. A power source 108 may apply electrical energy to the die 102 at the same time the pressure source 106 (e.g., two plungers) applies uniaxial pressure to the die 102, such that heat (e.g., spark plasma, electrical current, or any other source of heat) increases a temperature of the first component and the medium while the pressure source 106 applies the uniaxial pressure. Due to the fluid nature of the medium, the uniaxial pressure applied by the pressure source 106 results in isostatic or quasi-isostatic pressure being applied to the first component. Where used in this context, "quasi isostatic" refers to pressure that is applied to at least 50 percent of an external surface area of the first component, at least 60 percent of the external surface area of the first component, at least 75 percent of the external surface area of the first component, or the like. In that regard, heat and isostatic (or quasi-isostatic) pressure may be applied to the first component simultaneously. Such combination of heat and isostatic pressure may result in relatively uniform shrinkage and consolidation of the first component, resulting in a consolidated component having a complex shape that is similar to a shape of the first component (with reduced dimensions) prior to application of the heat and pressure. Although discussion here is related to complex shapes, IP-SPS can also or instead be used to create components having simple shapes.

In various embodiments, at least one of the pressure, the heat, or the electrical current may be applied in pulses. For example, the electrical current may have a period of two seconds and a duty cycle of 50 percent (50%). As another example, the pressure may be applied continuously, and the electrical current may be applied in pulses. As another example, the pressure and heat may be applied continuously.

As yet another example, the pressure and heat may be applied continuously, and the electrical current may be applied in pulses.

Due to the pressure applied during block 208, it may be desirable for the material from which the medium is made to have a greater compressive strength than the material from which the first component is formed at the temperature to which they are exposed in the chamber. Otherwise, application of the pressure may undesirably compact the medium instead of or in addition to the first component during block 208, thus altering the shape of the first component. For example, the medium may include at least one of a ceramic powder, a graphite powder, a metal powder, or the like. The material of the first component may include at least one of a metal, a ceramic, a composite, or the like.

Although the present disclosure is directed to use of a preformed component and a medium utilized in a SPS system, one skilled in the art will realize that the present disclosure is not limited to SPS systems. In that regard, any system that includes a chamber, a heat or electricity source, and a uniaxial (or other) pressure source may be used, in conjunction with a fluid medium, to consolidate a preformed component having nano-sized or micro-sized crystals or particles.

In block 210, at least one of the consolidated component or the medium may be removed from the chamber. In block 212, the medium may be reused during a subsequent iteration of the method 200. The resulting consolidated component may be considered the final product. Using this approach, a fully dense NC component is fabricated, and the powder can be used multiple times to increase efficiency and reduce waste. Additionally, multiple pre-formed components can be placed in the die and surrounded with powder in order to form multiple components simultaneously. That is, multiple first components may be placed in the chamber and surrounded with medium, and the pressure and at least one of heat or electricity may be applied to the multiple first components simultaneously.

In various embodiments, post processing methods may be applied to the product to achieve a desired effect. For example, the final product may be smoothed, painted, or otherwise manipulated after the processing to finish or polish the product.

In various embodiments, one or more blocks of the method 200 may be controlled by a controller. The controller may control one or more parameter within the chamber during the IP-SPS processing. For example, the controller may adjust at least one of a maximum pressure applied to the chamber, a rate of pressure change applied to the chamber, a maximum temperature applied to the chamber, a rate of increase of temperature applied to the chamber, an amount of electricity applied to the chamber, a rate of change of electricity applied to the chamber, a total processing time of the IP-SPS method, a period of pulses, a duty cycle, a pulse shape (e.g., square pulses or sinusoidal pulses), or the like. In various embodiments, the controller may determine optimal parameters based on information provided by a user of the system (e.g., material characteristics of the first component and the medium, a desired amount of consolidation, or the like), or the optimal parameters may be provided by a user of the system.

In various embodiments, the chamber may further include sensors capable of detecting properties within the chamber such as pressure, temperature, electrical current, or the like that are applied to the medium. The controller may receive the data from the sensors and adjust the parameters discussed above based on the desired parameters and based on the sensor data.

Figure 3:
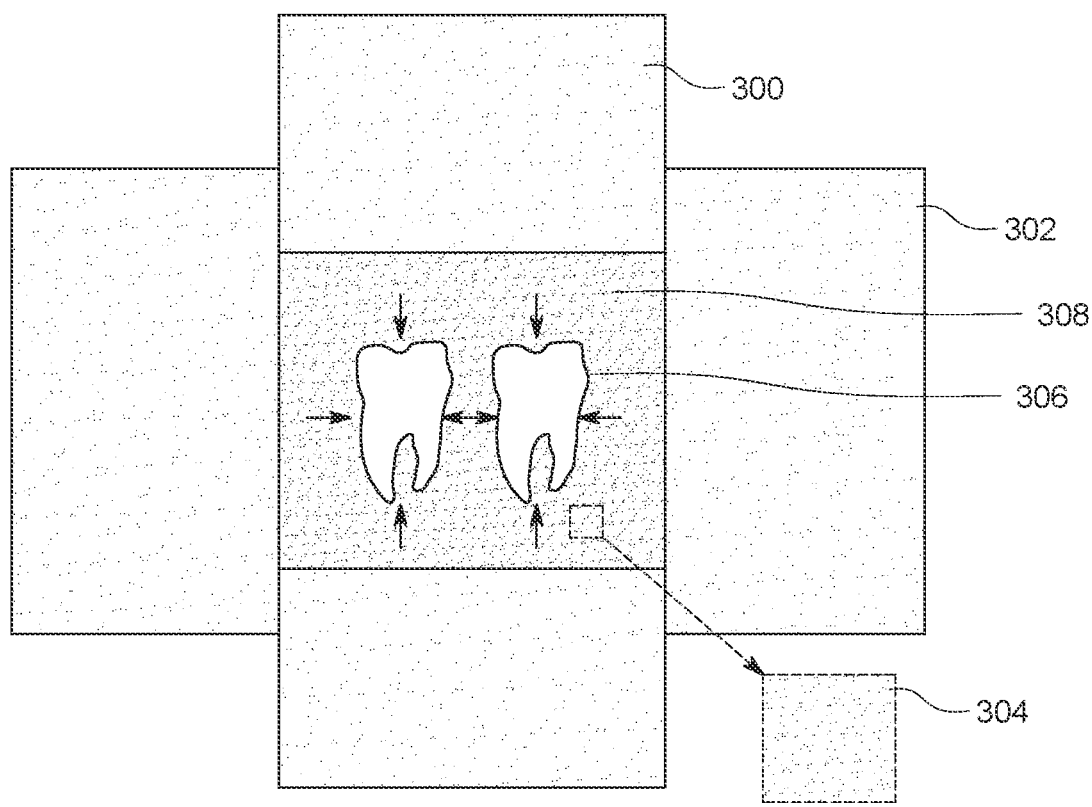
FIG. 3 is a drawing illustrating an exemplary implementation of the method of FIG. 2, in accordance with various embodiments of the present disclosure.

The systems and methods described herein may be referred to as Isostatic Pressure Spark Plasma Sintering (IP-SPS). The systems and methods may utilize powder (graphite powder, for example, although ceramic and other powders may also work sufficiently) as a fluid medium to transfer current and/or heat, and to form or apply isostatic/quasi-isostatic pressure (depending on the volume fraction of the medium powder to the compaction, and flowability of the medium powder) to the nano-structured materials and components, as shown in FIG. 3. Instead of only axial pressure, the shaped components compacted from NC metal, ceramic, or composite powders, experience uniform compressive stress from all orientations due to the fluid nature of the powder (i.e., isostatic or quasi-isostatic pressure). The isostatic pressure will facilitate more uniform shrinkage and consolidation of the shaped components, resulting in a more homogenous microstructure and lower levels of residual stresses, as well as enhanced physical and mechanical performance of the consolidated component. In addition, multiple components may be simultaneously processed in a single chamber using IP-SPS, increasing production efficiency.

In particular and referring to FIG. 3, an implementation of the method 200 was performed to form replacement teeth. Preformed teeth 306 (formed, for example, using ceramic, metal, or a composite) were placed in a chamber 308 and surrounded with a fine spherical powder 304 that had greater compressive strength than the material of the preformed teeth 306. The chamber 308, for example, is formed by a die 302 (which may be formed from ceramic, metal, a composite, or the like). A plunger 300 applied uniaxial pressure to the die 302 such that the powder 304 applied isostatic pressure to the preformed teeth 306 in response to application of the uniaxial pressure applied by the plunger 300.

Figure 4:
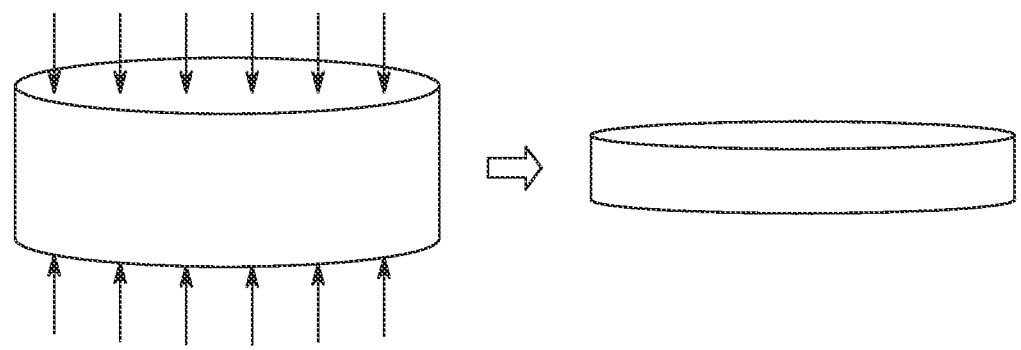
FIG. 4 is a drawing illustrating axial stress state on consolidated materials in conventional SPS, in accordance with various embodiments of the present disclosure.

Spark plasma sintering (SPS) is a pressure and pulsed current assisted high-speed sinter processing technique. However, only single axial pressure is applied to materials in current SPS, as shown in FIG. 4 (illustrating axial stress on consolidated materials in conventional SPS). The consolidated materials only shrink in one direction, which will cause undesriable texture formation in consolidated materials. The 3D shape of components may not be well controlled as the shape is limited by single axial pressure, and only simple geometric components can be sintered. Otherwise, components may become distorted during deformation.

Figure 5:
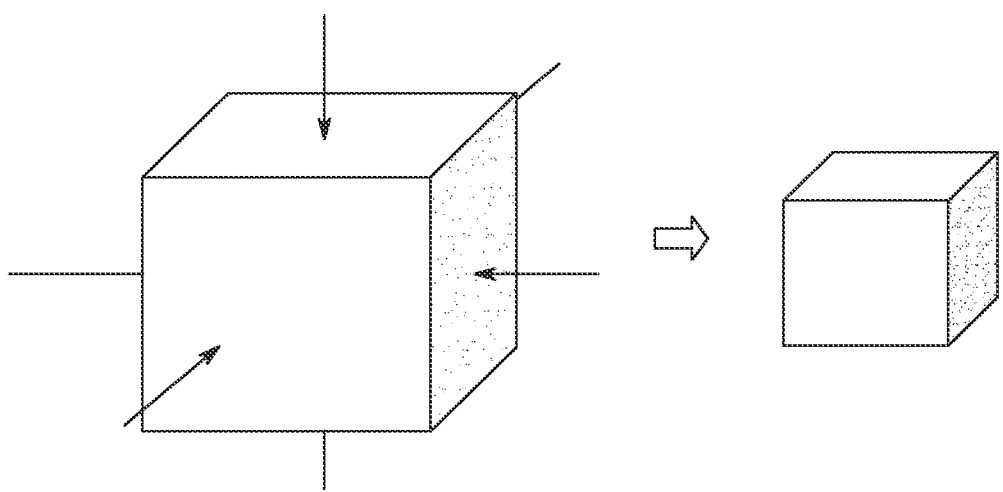
FIG. 5 is a drawing illustrating hydrostatic stress state on consolidated materials using IP-SPS, in accordance with various embodiments of the present disclosure.

Isostatic pressure SPS (IP-SPS), on the other hand, applies a uniform pressure to a component via a pressurized fluid medium. This pressure may be applied completely or partially uniformly in all directions (as opposed to the unidirectional pressure application of SPS). During the IP-SPS process, materials are subjected to a combination of rapidly elevated temperature exposure with simultaneous isostatic pressuring. Under these conditions, a powder compact is consolidated and shrinks homogenously in all dimensions, resulting in the processed component having the entire desired final geometry (as shown in FIG. 5, which shows hydrostatic stress on consolidated materials during IP-SPS). Note that this homogenous consolidation makes IP-SPS capable of processing complex shapes, allowing manufacture and processing of complex final products.

The use of IP-SPS to form components provides several benefits and advantages over conventional technology. First, IP-SPS combines the advantages of isostatic pressing of HIP and fast sintering of SPS processing for sintering NC materials, especially for shaped NC ceramic components. Sintering shaped NC ceramic components requires a relatively high heating rate, relatively high temperature, and high isostatic pressure, which are all achievable using IP-SPS processing. The present disclosure overcomes the limitations of HIP for NC materials, and overcomes the limitations of SPS for shaped components. The present disclosure further solves the difficulties associated with the consolidation of NC ceramic components with complicated shapes, which are not capable of being machined due to the high strength of NC ceramics. Many NC biomaterials, such as hydroxyapatite (HA), should be net-shaped, which requires a relatively high sintering temperature, a relatively high heating rate, and a relatively high isostatic pressure. Another benefit of the present disclosure is that it avoids texture formation caused by axial stress during conventional SPS processing, and therefore leads to improved mechanical properties in materials formed using the IP-SPS method relative to conventional SPS counterparts. Yet another advantage of the present disclosure is that the dies are not limited to graphite as the filled graphite powder can serve as a heating medium. A ceramic die can also be used for relatively high-temperature and high-pressure sintering, as well as for inside heat shielding. The present disclosure further provides the advantage of allowing multiple components to be formed using IP-SPS in one SPS cycle, increasing fabrication efficiency.

Figure 6:
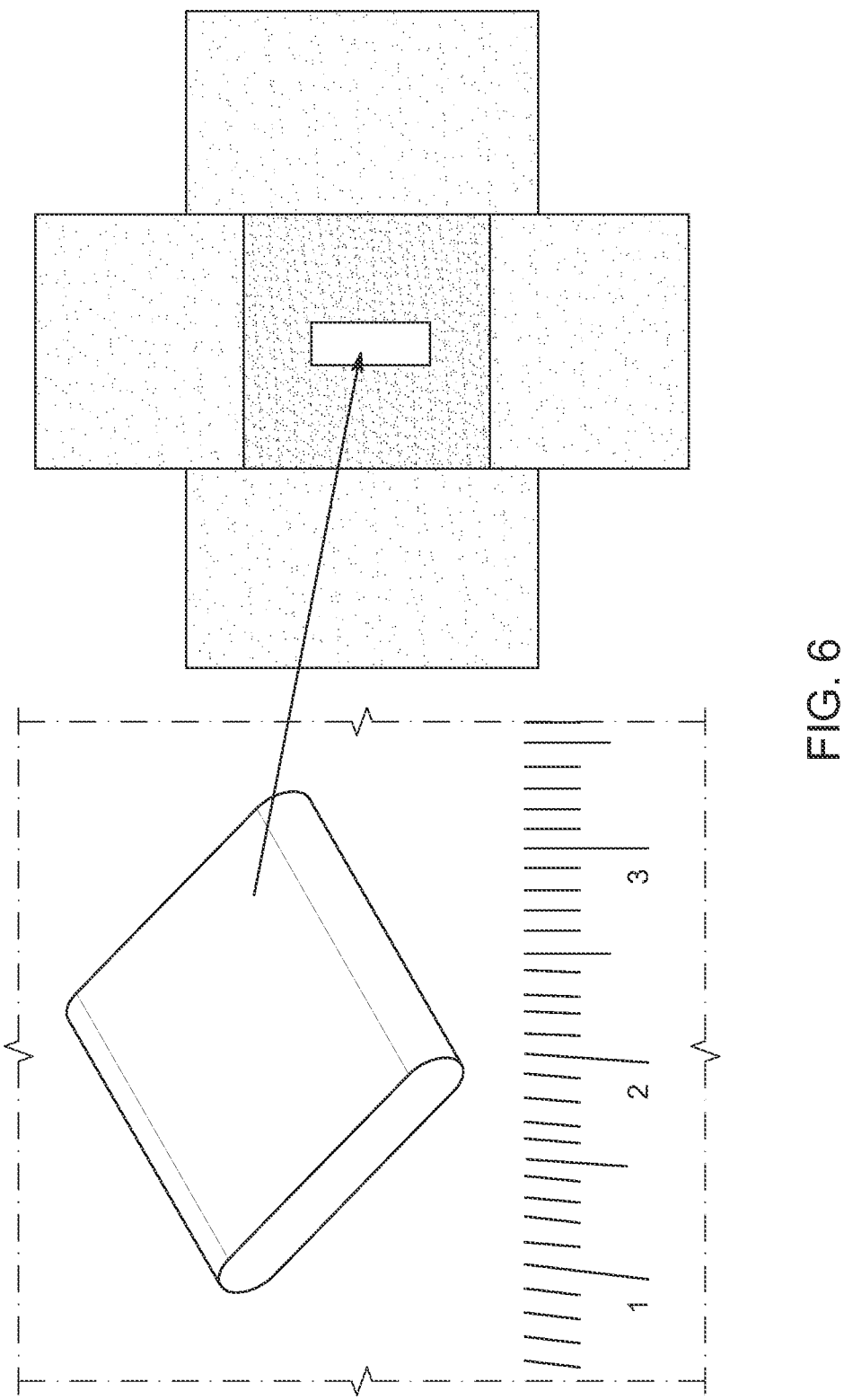
FIG. 6 is a picture illustrating a component formed using the method of FIG. 2, in accordance with various embodiments of the present disclosure.
Figure 7:
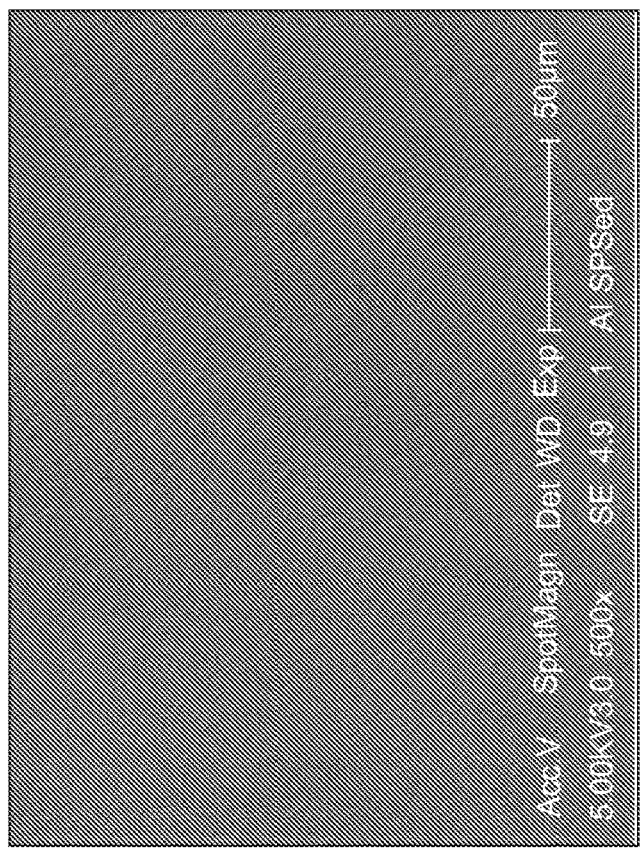
FIG. 7 is an enlarged view of a portion of the component of FIG. 6 illustrating variation of microstructure of the component before and after application of the method of FIG. 2, in accordance with various embodiments of the present disclosure.
Figure 7:
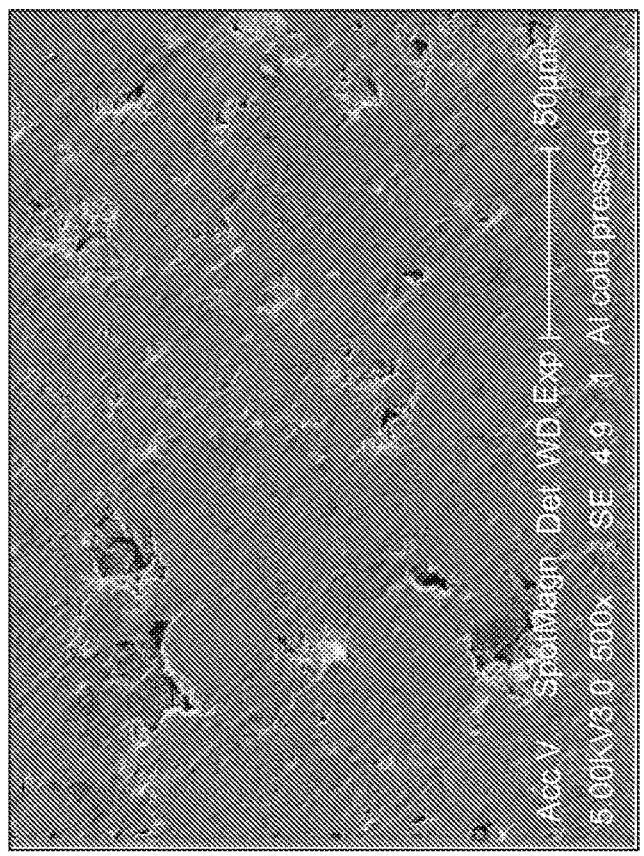

The inventors have successfully achieved some preliminary prototype results using the IP-SPS systems and methods described herein. FIG. 6 illustrates the results of a first prototype which is a NC component obtained from NC magnesium (Mg) powder and consolidated using IP-SPS processing. NC Mg powder was first cold pressed to a desired geometry, placed in the SPS die, and surrounded with graphite powder. Normal SPS processing was then performed on the Mg powder. The microstructure variation of the component before and after the IP-SPS process is shown in FIG. 7. The density was significantly improved using IP-SPS.

Figure 8:
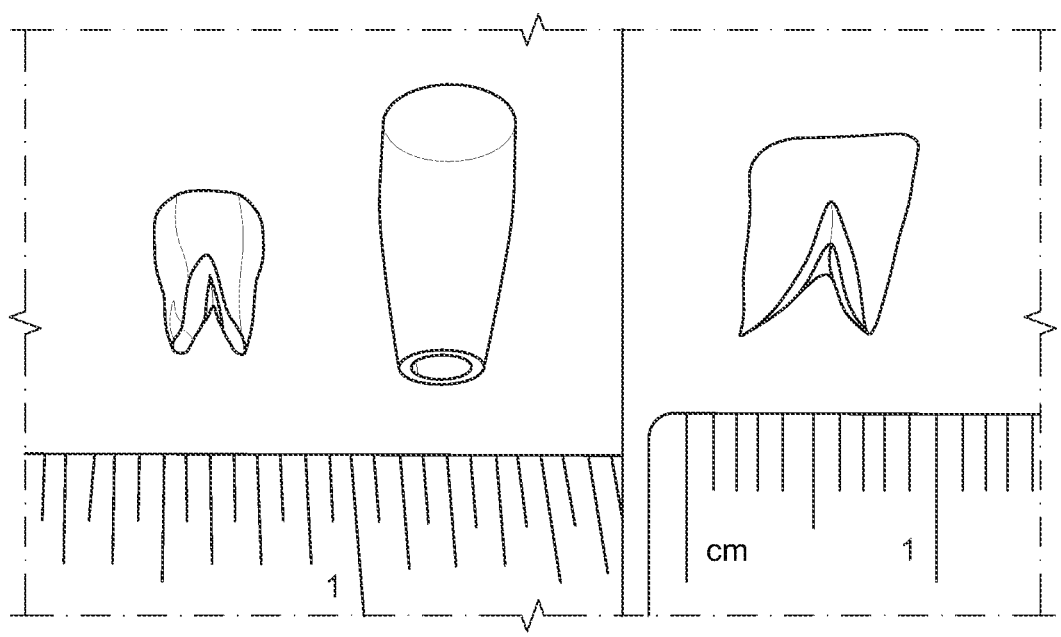
FIG. 8 is a picture illustrating another component formed using the method of FIG. 2, in accordance with various embodiments of the present disclosure.

FIG. 8 illustrates a second prototype which is a NC component with NC aluminum (Al) alloy powder that was manufactured using IP-SPS. The component was first mold cast into a tooth geometry, then IP-SPS was applied to the pre-formed tooth shape to compress the tooth shape into a fully dense tooth.

There are some processing parameters that may be optimized in IP-SPS, such as selecting the optimal powder transmitting media powder, the morphology of the medium powder, and the appropriate volume fraction of filled powder relative to the component processed using IP-SPS. Another processing parameter that can be optimized is predicting or calculating the shrinkage of the components during the IP-SPS process, or the like. Furthermore, at least one of a maximum pressure applied to the chamber, a rate of pressure change applied to the chamber, a maximum temperature applied to the chamber, a rate of increase of temperature applied to the chamber, an amount of electricity applied to the chamber, a rate of change of electricity applied to the chamber, a total processing time of the IP-SPS method, a period of pulses, a duty cycle, a pulse shape (e.g., square pulses or sinusoidal pulses), or the like of the IP-SPS method may also be optimized. For example, these parameters may be optimized based on material characteristics of the first component, material characteristics of the medium, desired properties of the final component, or the like.

Various entities may be interested in use of the systems and methods described herein. For example, companies manufacturing shaped metallic and ceramic components with nanocrystalline powder will be interested in using this invention. Potential applications for IP-SPS include bio-materials implants, functional (optical, electrical, magnetic, and semi-conductor) materials and components, and many other applications that use shaped nanocrystalline materials. Adoption of the systems and methods described herein may result in a broad impact on a wide range of industries including bio-materials, semiconductor, optical, tooling, and army/defense. For example, IP-SPS may be used to create magnetic components for advanced motors, which may be used in future generations of electric aircraft (as the shrinkage allowed by IP-SPS may result in relatively small magnetic components that can allow the motors to be made relatively small and lightweight compared to conventional motors). IP-SPS may further be used in the sports industry to form advanced golf balls, tennis rackets, cross-country running spikes, or the like. IP-SPS may also be used to form optical components that utilize nanostructures (as nanostructure components have transparent optical properties, allowing them to be used for applications such as missile dome windows).

Where used herein, "at least one of A or B" refers to any of A alone, B alone, or A and B. Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

What is claimed is:

1. A method of forming a consolidated component having a complex shape, the method comprising:
providing a first component comprising at least one nanostructured material, wherein the first component has a first shape similar to the complex shape;
placing the first component in a chamber and surrounding the first component with a medium, wherein the medium comprises a fine spherical graphite powder; and
applying pressure and electrical current into the chamber to process the first component to form a consolidated component having the complex shape.

2. The method of claim 1, wherein applying pressure includes applying pressure uniaxially to the medium, wherein the medium converts the uniaxial pressure into isostatic pressure that is applied to the first component.

3. The method of claim 2, wherein the isostatic pressure that is applied to the first component provides relatively uniform shrinkage and consolidation of the first component to cause the consolidated component to have the complex shape.

4. The method of claim 1, wherein providing the first component includes forming the first component using at least one of injection molding, mold powder casting, or net-shape sintering.

5. The method of claim 1, wherein the medium has a greater compressive strength than the first component.

6. The method of claim 1, wherein the first component includes a plurality of first components, and applying pressure and electrical current includes applying pressure and electrical current to the chamber while the plurality of first components are in the chamber to form multiple consolidated components, simultaneously.

7. The method of claim 1, wherein the chamber is a die chamber located inside of a spark plasma sintering (SPS) chamber, and applying pressure and electrical current includes applying uniaxial pressure and high temperature plasma to the die chamber using SPS.

8. The method of claim 7, wherein placing the first component in the chamber and surrounding the first component with the medium includes placing the first component in the die chamber, surrounding the first component with the medium, and placing the die chamber with the first component and the medium in the SPS chamber.

9. The method of claim 8, further comprising:
removing an SPS die from the SPS chamber;
removing the medium from the SPS die; and
reusing the medium during a subsequent iteration of the method.

10. A system for forming a consolidated component, the system comprising:
a chamber configured to receive a first component comprising at least one nanostructured material and medium such that the medium surrounds the first component, wherein the medium comprises a fine spherical graphite powder;
a pressure source configured to apply pressure to the chamber; and
an electrical current source configured to apply electrical current to the chamber such that the pressure and the electrical current are applied to the first component via the medium to consolidate the first component.

11. The system of claim 10, wherein the pressure source is configured to apply the pressure uniaxially to the medium, wherein the medium converts the uniaxial pressure into isostatic pressure that is applied to the first component.

12. The system of claim 10, wherein the medium has a greater compressive strength than the first component.

13. The method of claim 1, wherein the at least one nanostructured material comprises nanocrystalline powder with grain sizes below 100 nm.

14. The system of claim 11, wherein the isostatic pressure that is applied to the first component provides relatively uniform shrinkage and consolidation of the first component to cause the consolidated component to have the complex shape.

15. The system of claim 10, wherein the first component is formed using at least one of injection molding, mold powder casting, or net-shape sintering.

16. The system of claim 10, wherein the chamber is configured to receive a plurality of first components, and when the pressure source applies pressure and the electrical current source applies electrical current to the chamber, the plurality of first components in the chamber form multiple consolidated components, simultaneously.

17. The system of claim 10, wherein the chamber is a die chamber located inside of a spark plasma sintering (SPS) chamber, and wherein applying pressure and electrical current to the chamber includes applying uniaxial pressure and high temperature plasma to the die chamber using SPS.

18. The system of claim 17, wherein the chamber receives the first component in the chamber by receiving the first component in the die chamber, surrounding the first component with the medium, and placing the die chamber with the first component and the medium in the SPS chamber.

19. The system of claim 18, wherein the chamber is further configured to:
remove an SPS die from the SPS chamber;
remove the medium from the SPS die; and
reuse the medium during a subsequent iteration of forming a consolidated component.

20. The system of claim 10, wherein the at least one nanostructured material comprises nanocrystalline powder with grain sizes below 100 nm.

* * * * *